J. A. HUNTER & D. EDGE.
TEMPERATURE INDICATING AND RECORDING APPARATUS.
APPLICATION FILED JAN. 12, 1915.
1,220,635.
Patented Mar. 27, 1917.
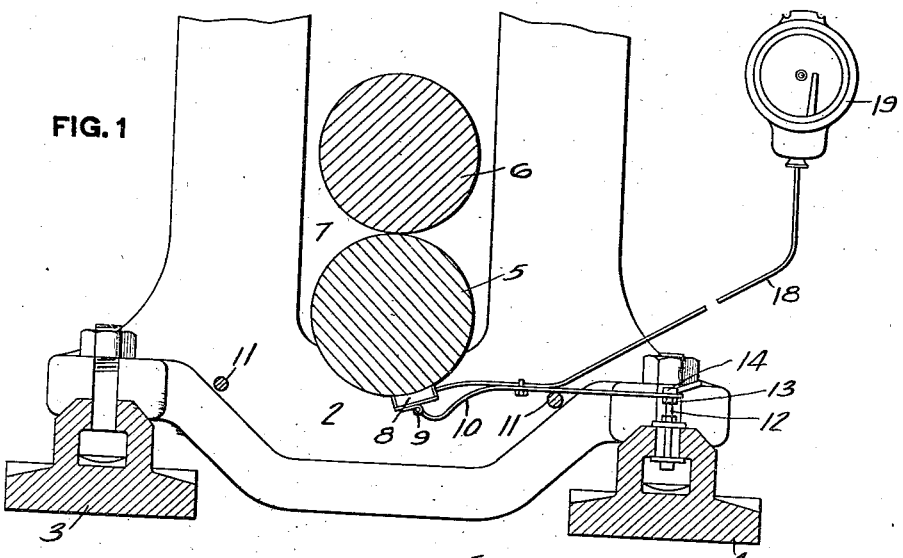
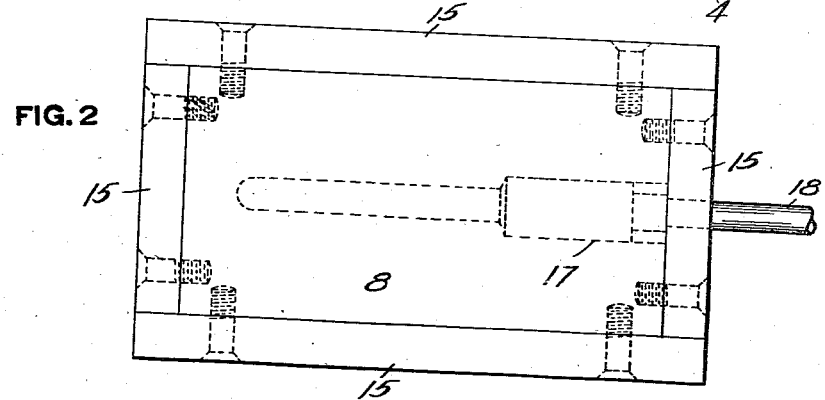
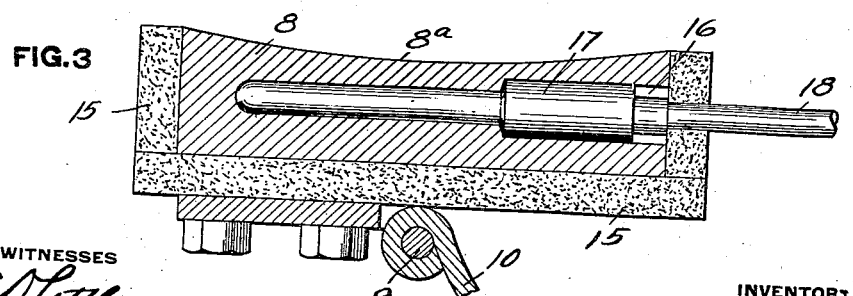
INVENTORS
John A. Hunter
Dexter Edge

UNITED STATES PATENT OFFICE.

JOHN A. HUNTER, OF BEN AVON, AND DEXTER EDGE, OF PITTSBURGH, PENNSYLVANIA, ASSIGNORS TO AMERICAN SHEET AND TIN PLATE COMPANY, OF PITTSBURGH, PENNSYLVANIA, A CORPORATION OF NEW JERSEY.

TEMPERATURE INDICATING AND RECORDING APPARATUS.

1,220,635.

Specification of Letters Patent. Patented Mar. 27, 1917.

Application filed January 12, 1915. Serial No. 1,800.

*To all whom it may concern:*

Be it known that we, JOHN A. HUNTER and DEXTER EDGE, both citizens of the United States, and residents, respectively, of Ben Avon and Pittsburgh, in the county of Allegheny and State of Pennsylvania, have invented certain new and useful Improvements in Temperature Indicating and Recording Apparatus, of which the following is a specification.

Our invention relates to apparatus used to indicate and record temperatures, and more particularly relates to apparatus for use in determining and recording the temperature of the rolls of hot mills employed in the manufacture of rolled metal sheets and plates.

Heretofore, a thermo-couple inserted in a hole drilled in a roll has been employed to determine the approximate temperature of the roll surface in operating hot rolling mills. The use of a thermo-couple in this way necessitates a hole being drilled axially and then angularly until its end is as close as possible to the outer working surface of the barrel of the roll. To provide the necessary opening in the roll is a slow and costly operation, and is so expensive that it can not be done with every roll, but is done only occasionally with a single roll.

One object of our invention is to provide apparatus of novel construction having improved means whereby the temperature of the barrel or working surface of the rolls of a rolling mill is indicated and a record of variations or fluctuations in the temperature of the rolls is obtained.

Another object of our invention is to provide temperature indicating apparatus having novel means whereby the temperatures of the rolls of a rolling mill are indicated and are recorded for an indefinite time interval.

A further object of the invention is to provide a temperature indicating and recording device having improved means for maintaining the apparatus in operative engagement with the rolls of which the temperature is being determined.

Still further objects of the invention consist in the novel combination and arrangement of parts hereinafter more fully described and specifically pointed out in the appended claims.

Referring now to the drawings forming part of this specification, Figure 1 is a sectional end elevation showing a hot rolling mill having temperature indicating and recording apparatus constructed and arranged and applied for use thereon in accordance with our invention.

Fig. 2 is a plan on a larger scale showing details of the construction of the contact block forming part of our improved apparatus.

Fig. 3 is a sectional side elevation of the contact block shown in Fig. 1, and in detail in Fig. 2.

In the accompanying drawings, the numeral 2 designates one of the usual pair of roll housings which are secured on the housing shoes 3 and 4 and which have rolls 5 and 6 operatively mounted in the windows 7 thereof in the ordinary known manner.

Yieldingly held in position against the working face of the bottom roll, on the lowermost side of the roll, is a contact block 8 which is pivoted by a pin 9 to one end of the bent rod or bar 10. The bar 10, at an intermediate point in its length, rests on one of the separators or spreaders 11 by which the roll housings are secured in spaced position on the housing shoes 3 and 4, and its rear end, which is arranged to spring, is adjustably secured by means of the bolt 12 and nuts 13 and 14 to the housing shoe 4 at the rear or catcher side of the mill.

The nuts 13 and 14 on the screw threaded bolt 12 which is removably secured in the slot of the housing shoe 4 engage with opposite sides of the bar 10 in holding the block 8 in yielding contact with the roll.

The contact block 8 shown is preferably made of cast iron and one surface, 8$^a$, thereof is made concave, to a radius corresponding to that of the roll to which it is applied.

The surface opposite the concave surface 8$^a$ and the edges of the block are covered with insulating material 15 to prevent rapid radiation of the heat absorbed by the contact block from the heated surface of the rotating roll when the apparatus is in use.

A transverse opening 16 is provided in the block 8 in which a thermometer 17 is secured, this opening being made of a size which brings its surfaces into close contact with the surfaces of the thermometer, so as to facilitate the transference of heat from the contact block 8 to the material forming the thermometer 17.

The thermometer 17 is attached by a connection 18 to a recording gage 19 which is conveniently positioned at a point out of the way of the workmen operating the hot mill. While a thermometer is the particular means shown and described for obtaining the desired temperature measurements, obviously a thermo-couple or other equivalent of the thermometer may be used.

The operation of our improved apparatus will now be described:

The apparatus is assembled as shown, (ordinarily remaining in position as a permanent part of the equipment of the mill) by positioning the contact block 8 in engagement with the bottom roll 5 at about the middle of its length. The hand nut 13 is then screwed down to secure the contact block in operative engagement with the face of the roll, as is shown in Fig. 1.

When secured to the rolling mill in this way the spring-like bar 10 to one end of which the rubbing block is pivotally secured will yieldingly hold the block 8 in engagement with the roll, and as the rotating surface of the roll engages with the contact block the block will acquire the same temperature as that of the roll surfaces, as the rolls become heated by successive rolling operations. By pivotally connecting the block 8 to the end of the supporting bar 10 it is free to move so as to be in close engagement with the roll and the yielding holding bar 10 maintains the contact block in contact with the rotating roll surface.

The temperature of the contact block is radiated through the walls of the thermometer 17 and the thermometer, through the connection 18, transmits the temperature of the roll to the gage 19 which indicates and records the temperature on the renewable chart forming part of the recording gage.

The insulation on the contact block prevents rapid radiation of heat absorbed thereby and in this way assists in maintaining the block at the same temperature as that of the contacting roll surface. By adjusting the recording gage to allow for the easily determined difference between the actual and indicated temperature of the roll, the correct temperature will not only be indicated but will be recorded on the gage.

As the temperature of the roll gradually increases the changes in temperature will be indicated and recorded, and after the desired temperature is reached, variations in this temperature are indicated and recorded for as long as the operation of the mill is continued.

The advantages of our invention will be apparent to those skilled in the art. By the use of our improved apparatus the temperature of the barrel or working surface of any of the large number of rolls used at different times or on different mills is accurately determined. The apparatus is simple, is cheaply constructed, and is easily and quickly applied for use. The means employed for securing the apparatus in operative position will make it feasible to remove the apparatus from one hot mill to another.

Modifications in the construction and arrangement of the parts may be made without departing from our invention or defined in the appended claims.

We claim:—

1. In apparatus for determining the temperature of rolls, the combination with a rotatable roll of a rubbing block, means for holding said rubbing block in yielding engagement with the roll surface, said rubbing block having an opening therein, a temperature measuring instrument within the opening in said block with the surfaces thereof in close contact with the walls of said opening, a temperature indicator or gage, and means operatively connecting the said indicator to said measuring instrument.

2. In apparatus for determining the temperature of rolls, the combination with a rotatable roll of an insulated rubbing block in frictional contact with the roll surface, said rubbing block having an opening therein, a temperature measuring instrument within the opening in said block with the surfaces thereof in close contact with the walls of said opening, a temperature indicator, means operatively connecting said instrument and indicator, yielding means for holding said rubbing block in contact with the roll surface, and means for adjusting said rubbing block relative to the roll surface to vary the force with which the block is held in frictional contact with the roll surface.

3. In apparatus for determining the temperature of rolls, the combination with a rotatable roll of a rubbing block, means for holding said rubbing block in yielding engagement with the roll surface, a temperature measuring instrument in operative engagement with the block, a remotely located temperature indicator, and flexible means operatively connecting the said indicator to said measuring instrument.

4. Apparatus for determining the temperature of rolls comprising a rubbing block having a curved surface arranged to contact with the revolving roll surface, said rubbing block having an opening therein, a temperature measuring instrument within the opening in said block with the surfaces thereof in close contact with the walls of said opening, a temperature indicator, means operatively connecting said instrument and indicator, and yielding means for holding said rubbing block in contact with the roll surface.

In testimony whereof, we have hereunto set our hands.

JOHN A. HUNTER.
DEXTER EDGE.

Witnesses:
W. T. BROWNSCOMBE,
J. H. BOWMAN.